J. F. BIRCHARD.

FOLDING EXTENSION-TABLE.

No. 7,115. Reissued May 16, 1876.

WITNESSES

E. S. Nottingham,

Albert W. Bright

By

INVENTOR

John F. Birchard,

By Leggett & Leggett,

Attorneys.

N. PETERS, PHOTO-LITHOGRAPHER, WASHINGTON, D. C.

UNITED STATES PATENT OFFICE.

JOHN F. BIRCHARD, OF MILWAUKEE, WISCONSIN.

IMPROVEMENT IN FOLDING EXTENSION-TABLES.

Specification forming part of Letters Patent No. 160,506, dated March 9, 1875; reissue No. 7,115, dated May 16, 1876; application filed March 24, 1876.

*To all whom it may concern:*

Be it known that I, JOHN F. BIRCHARD, of the city and county of Milwaukee, in the State of Wisconsin, have invented certain Improvements in Folding Extension-Tables, of which the following is a specification:

The object of my invention is to construct an extension-table in such a manner that it may be folded or turned up and occupy but little space when not required for use, and for convenience and economy in transportation; also, for supporting the extra or loose leaves which form the top of the table when extended; and consists in connecting the permanent top and slides to the permanent pillars or feet-supports by pivots or hinges; also, in a manner of pivoting or hinging and bracing the loose legs, supporting the other end of the table when required for use, or extended; and in a manner of supporting the extra leaves of the table when folded or turned up, as will be hereafter more fully described.

Figure 1:
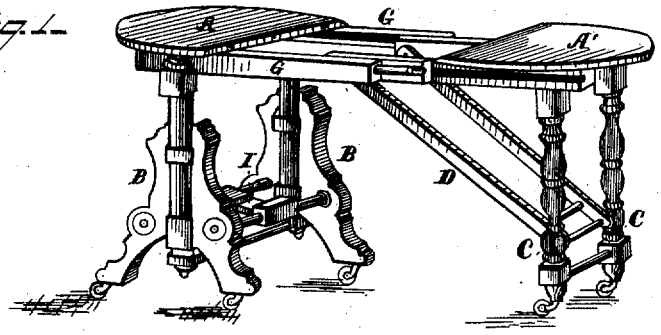
Figure 2:
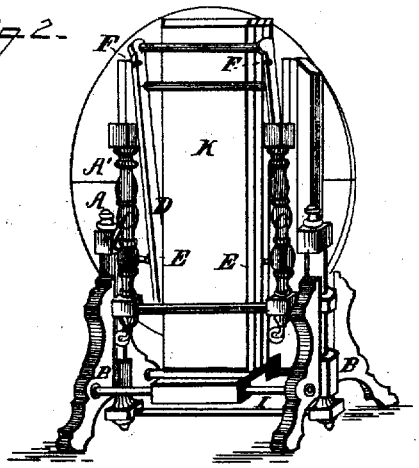
Figure 3:
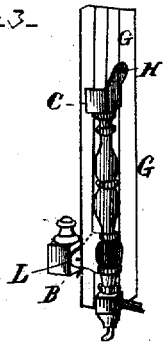

In the accompanying drawings, forming part of this specification, Figure 1 is a perspective view of the table turned down and extended for use. Fig. 2 is a perspective view of the same folded up and supporting the loose leaves. Fig. 3 is a sectional view of the slide and joints attached to pillar B and leg C.

A is a permanent top leaf at one end of the table; A′, the leaf at the other end of the table. B B are pillars supported by feet at the permanent end of the table. To these pillars are attached the slides, and to them the top of the table. C C are loose or swinging legs attached to the slides G, and when out in place support the end of the table. D is a brace, which is secured at one end to the extension-slides G G, and is provided at the other end with slots F F, which slots engage with the pins E E upon the legs C C, when the table is turned down in position shown in Fig. 1, for the purpose of bracing such legs and holding them firmly in such position. H is a metal piece on the ends of legs C C, with a pin or bolt passing through the metal piece H into slide G, forming a hinge. I is a rest or shelf-support on the feet, which support pillars B B for the loose leaves to stand on when the table is folded up. K are loose leaves standing on rest I; L, a pivot-joint attached to pillar B, forming a joint or hinge by which the table is folded up.

The advantages of this table are simplicity and cheapness of construction. It is compact, and designed to be folded up so as to pass through any ordinary door, or placed against the side of the room, thereby economizing space when small apartments are occupied.

Having described my invention, what I claim as new, and desire to secure by Letters Patent, is—

1. An extension-table top, adapted to be folded parallel with its supporting-legs, substantially as and for the purpose described.

2. An extension folding table, constructed as described, and provided with leaves A and A′, permanent pillars and legs B B, slides G, and joints L, substantially as shown and specified.

3. The combination of loose legs C C, brace D, and slides G, arranged substantially as described.

4. The shelf I for supporting the loose or extra leaves of an extension-table, in combination with pillars and feet B B, substantially as shown and described.

JOHN F. BIRCHARD.

Attest:

D. B. FRANKENBURGER,
LOUIS TAYLOR.